(No Model.) 2 Sheets—Sheet 1.
J. M. BAILEY.
COMBINED PULVERIZER.
No. 362,241. Patented May 3, 1887.
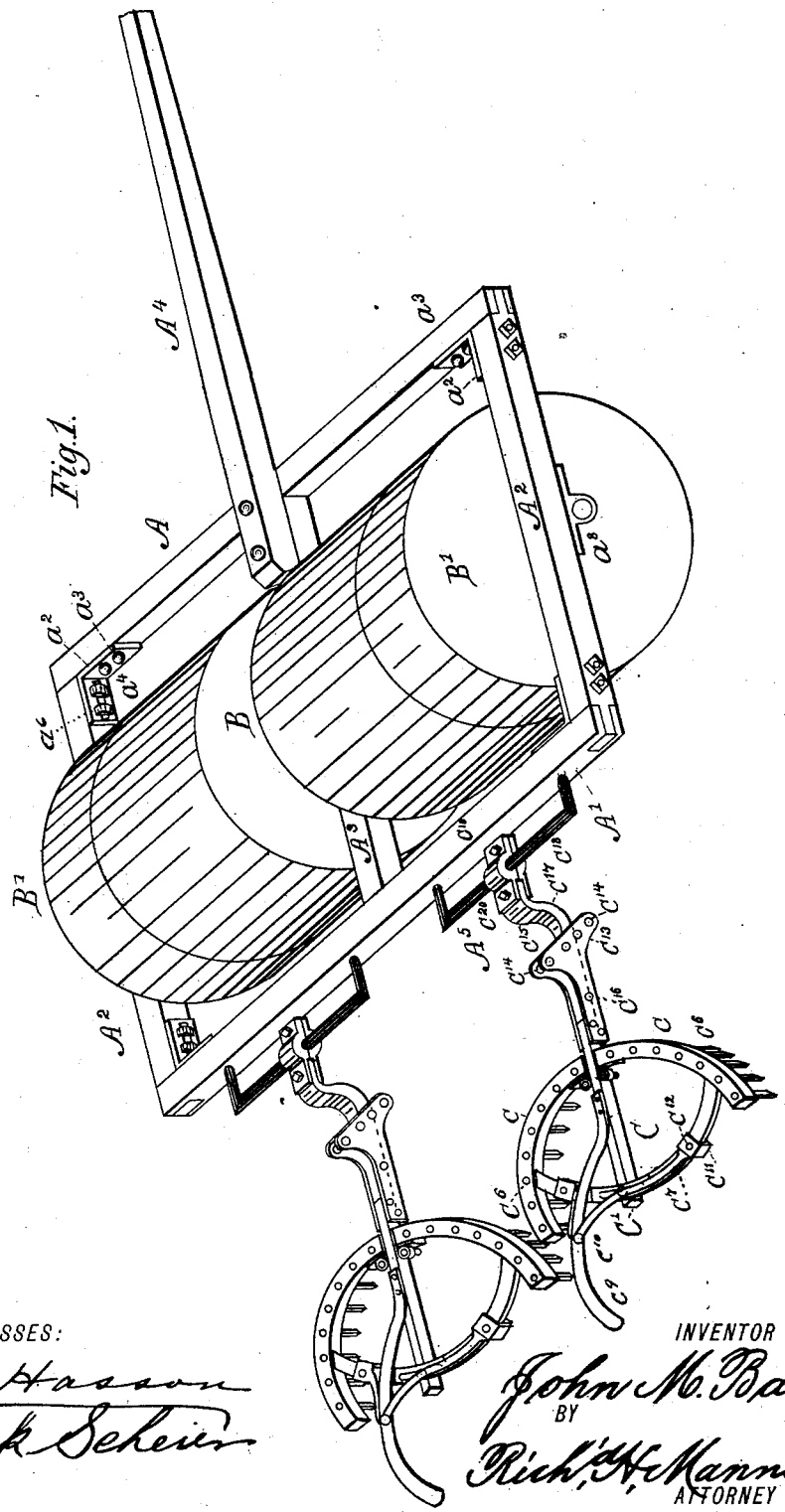
WITNESSES:
INVENTOR
John M. Bailey
BY
Rich'd H. Manning
ATTORNEY (No Model.) 2 Sheets—Sheet 2.
J. M. BAILEY.
COMBINED PULVERIZER.
No. 362,241. Patented May 3, 1887.
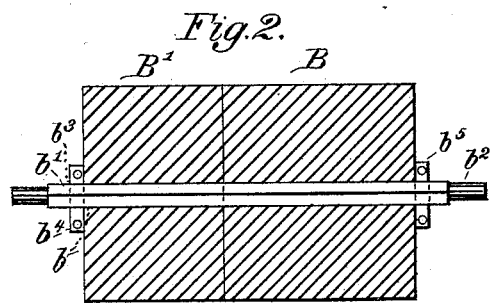
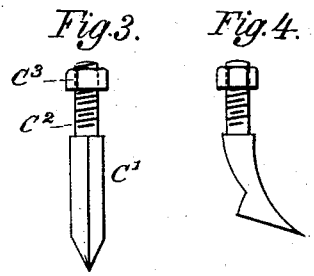
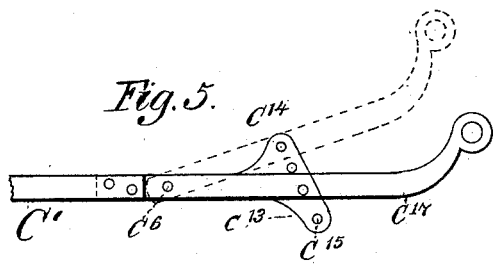
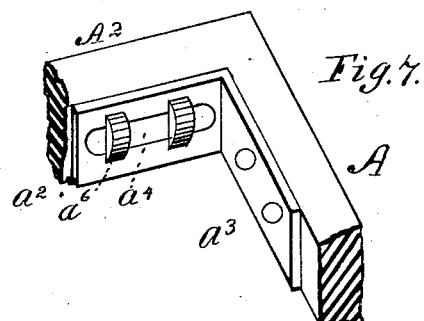
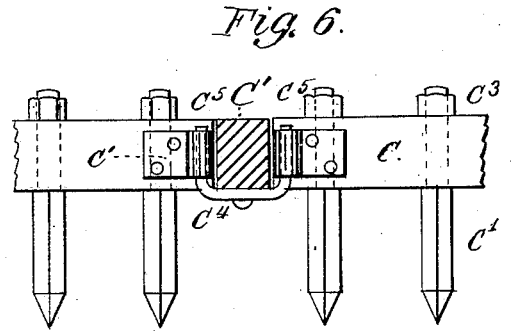
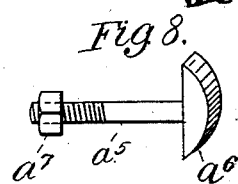
WITNESSES:
S. L. C. Hosson
Frank Scheier
INVENTOR
John M. Bailey
BY
Rich'd N. Manning
ATTORNEY
N. PETERS, Photo-Lithographer, Washington, D. C.

UNITED STATES PATENT OFFICE.

JOHN M. BAILEY, OF LEE'S SUMMIT, MISSOURI.

COMBINED PULVERIZER.

SPECIFICATION forming part of Letters Patent No. 362,241, dated May 3, 1887.

Application filed September 10, 1886. Serial No. 213,266. (No model.)

*To all whom it may concern:*

Be it known that I, JOHN M. BAILEY, a citizen of the United States, residing at Lee's Summit, in the county of Jackson and State of Missouri, have invented certain new and useful Improvements in Combined Pulverizers; and I do hereby declare that the following is a full, clear, and exact description thereof, which will enable others to make and use the same, reference being had to the accompanying drawings, forming a part of this specification.

My invention has for its object to afford a combined pulverizer for service in the field where the distances between the rows are variable, and the pulverizers may be adjusted to meet the variable width between said rows, and to afford a rotating pulverizer for crushing the lumps or clods of soil above the surface of the ground, and a disintegrating and excavating pulverizer following for pulverizing or breaking the crust and extending beneath the surface of the ground; and it consists in the novel combination and arrangement of parts, hereinafter fully described, and specifically pointed out in the claims.

In the drawings, Figure 1 is a perspective view of the roller in sectional parts journaled to the traction-frame, and also of the adjustable winged harrows attached to and in rear of said roller. Fig. 2 is a sectional elevation taken longitudinally through a single section of the roller, and showing the form of shaft and means for securing the sections of the roller at adjustable points on the shaft in the frame of the machine. Fig. 3 is a view of one of the teeth of the harrow, and Fig. 4 is a form of plow to be used in place of the harrow-teeth. Fig. 5 is a side view of the clevis and the adjustable tongue. Fig. 6 is a view of a portion of the harrow-beam on opposite sides of the center-bar, and showing the hinged joints for the wings. Fig. 7 is a view of a portion of the frame described by the angles, and showing the means for securing the ends of the frame to its front and rear portions removably. Fig. 8 is a view of one of the securing or key bolts.

In the construction of my invention I first make a rectangular frame to receive the improved roller, which is made in cylindrical sections B B′, placed in pairs within the frame, said frame being made with a front beam, A, rear beam, A′, and removable end beams, A² A². Between the end beams, A² A², extending in a central relation to the frame from the front beam, A, to the rear beam, A′, is the beam A³, to which is bolted one end of the pole A⁴, in the direction in which the sections B B′ of the rollers are propelled. The opposite end beams, A² A², are provided with tenons $a\ a$, which fit within mortises $a'$. Upon the inner sides of the beams A A′ A², and at the joints, are placed the angle-irons $a^2$, which angle-irons are secured fixedly to the front and rear beams, A A′, by means of the bolts $a^3\ a^3$. The portion of the angle-irons $a^2$ opposite the ends A² is slotted longitudinally at $a^4$, and through said end beam, A², upon each respective end of beam, and through the slotted portion $a^4$ of the angle-iron, I introduce a key-bolt, $a^5$, having a flat head, $a^6$, which will pass through the slot $a^4$ when inserted with the flat head running in the same direction with the slot $a^4$, and when turned at right angles will prevent the withdrawal of the bolt. The opposite end of bolt $a^5$ is screw-threaded and a nut, $a^7$, fitted thereto, so that when the end beams, A² A², are joined to the front and rear beams, A A′, the tightening of the nut $a^7$ will prevent the turning of the head $a^6$ of said key-bolt, and upon unscrewing the nut $a^7$ the head $a^6$ of the bolt may be turned and the end beams, A² A², be withdrawn with the bolts $a^5\ a^5$.

Between the end beams, A², and the central transverse beam, A³, are placed the roller-pulverizers B B′, made preferably of iron. The width or tread of the sections B B′ of the roller are made to vary, the section B being made of an increased width to that of the section B′, and are placed in series in the frame A A′ A² A² in a corresponding alignment. Transversely through the center of each roller I make an angular perforation, $b$, and fit an angular shaft, $b'$, therein. Each shaft $b'$ is made of sufficient length to extend from the end beam, A², to a point midway of the central transverse beam, A³, one end of said shaft being journaled in the journal-box $a^8$ on said beam, and the opposite end of said shaft in the journal-box placed under said beam A³, and corresponding in position to the box $a^8$ on said beam A², and upon said shaft I place two or more rollers varying in width, and upon the opposite side of the frame and of the beam $A^3$ I place other rollers journaled in the frame in the same relative manner.

The aggregate width of rollers B B' is made less than the length of shaft $b'$, to afford room for the collar $b^3$, which is placed around the shaft $b'$ into separate opposite parts conforming to the angular sides of the shaft $b'$, which parts are held adjustably to the shaft by means of the screw-bolts $b^4$, which pass through flanges $b^5$, extending from each opposite side of the collar $b^3$, and whereby the collar $b^3$ may be removed from the shaft or secured adjustably at any point thereto.

To the rear beam, A', of the machine-frame, in rear of the roller, I attach a round bar, $A^5$, the opposite ends of which bar are bent at right angles thereto and inserted through said rear beam, A', and securely fastened to said beam by nut-bolts, or in any other convenient manner. Said bar $A^5$ extends relatively to within a short distance of the opposite beams, $A^2 A^3$, and upon the opposite end of the beam A', I attach a similar bar, $A^5$. To said bars $A^5$ $A^5$, I then attach the adjustable winged harrow C. This harrow C is constructed as follows: To one end of a central beam, C', I hinge upon and to the opposite sides of said beam the wings or harrow-teeth beams $c\ c$. Each wing $c$ is made preferably to extend from its hinging-point to the beam C' rearwardly in a curved relation, and is provided with the adjustable teeth $c'$, one of which is seen in Fig. 3, and which has a neck, $c^2$, and nut $c^3$, whereby the teeth can be readily taken from the harrow-beam and a shovel or plow-shaped pulverizer inserted in their place. For the purpose of hinging the wings $c$ to the center beam, C', I bolt to and beneath the beam C' a plate, $c^4$, which extends transversely beneath said beam, and from said plate $c^4$ extend vertically upon opposite sides of said beam the pintles $c^5\ c^5$. Upon the extreme ends of and within the wings $c\ c$ are the hinge-leaves $c'\ c'$, which fit over the pintles $c^5\ c^5$. I then attach to the wings $c\ c$, near the ends, by means of the pivot $c^6$, an adjusting-bar, $c^7$, one end curved, the opposite end of which bar is slotted longitudinally, and through said slot extends in a vertical relation the screw-bolt $c^8$, which bolt is fastened to the central beam, C', one of said bars $c^7$ overlapping the end of an opposite bar on the said central beam, C'.

For the purpose of guiding the harrow, I fixedly attach to the central beam, C', a curved handle, $c^9$, which extends upwardly and rearwardly from said beam C'. For the purpose of bracing the handle $c^9$, I extend laterally from said handle, and on opposite sides, the arms $c^{10}\ c^{10}$, which are rigidly united at one end to said handle and extend to the curved bar $c^7$, about midway between the central beam, C', and the extended wings $c$ of the harrow. A clasp, $c^{11}$, is attached rigidly at one end to the end of said arm $c^{10}$, and passed around said curved bar $c^7$, and secured adjustably by means of a screw-bolt, $c^{12}$, which passes through the free end of said clasp and through the end of the said arm $c^{10}$, and whereby the wings $c\ c$ of the harrow are held adjustably at any desired point.

To the opposite end of the central beam, C', from that across which the curved bar $c^7$ is supported, and which end projects beyond the wings $c\ c$ of the harrow, I attach a clevis, $c^{13}$, which is bolted rigidly to the center beam, C', of the harrow, the opposite forked end of which clevis is made of an increased width in a vertical relation, or with branches $c^{14}$, through which are made a series of perforations, $c^{15}$. To the clevis $c^{13}$, and between the forked ends of said clevis, I attach to the pivot $c^{16}$, which passes through said clevis in the rear of the branches $c^{14}$, one end of a tongue, $c^{17}$, and to the opposite end I attach a journal-box, $c^{18}$, which box receives the rod $A^5$ on the rear beam, A', of the machine, and by means of the bolts $c^{19}$ the cap-plate $c^{20}$ of the journal-box may be removed. Through the perforations $c^{15}$ in the clevis I introduce a bolt, which passes through a perforation made in the tongue $c^{17}$.

In the operation of my improved pulverizers it will be readily seen that my roller prevails over the ordinary roller which is in one piece, as it is adapted to wide or narrow spaces between the rows by taking off either section; and for this purpose the end beam, $A^2$, is removed and the proper width of roller placed upon the shaft, the space between rows, for instance, necessitating the use of a narrow section of the roller. The roller is then adjusted upon the shaft in the frame of the machine, so as to meet the approximate width between opposite rows, and also to meet the distance which the section of roller upon the opposite end of the machine requires to gage the distance between double rows. This adjustment having been made, the collars $b^5$ are used to clamp the section of roller jointly or singly in place upon the shaft. This having been accomplished, the harrow journaled to the rod $A^5$ is moved along in one direction or the other to come in rear of section of roller which has been arranged in place, the bolts $c^{12}$ are loosened on the clasps $c^{11}$ around the curved bar $c^7$, and the wings $c\ c$ are drawn toward each other the proper distance to correspond with the width of the section of roller in front. Thus it will be seen that the harrow may expand or contract as the width of roller which precedes it requires. The wings $c\ c$ of the harrow may be made to extend at right angles from the center beam, C', if preferred.

Whenever it is desired to set the teeth of the harrow deeper in the ground, I take out the bolt which holds the tongue between the clevis from acting upon its pivotal end, and depress the upper branch of the clevis, and insert the bolt through one of the upper perforations, $c^{15}$, in said clevis and through the tongue, the tongue being then in the position indicated in the dotted line in Fig. 5; and should less depth be required I adjust the tongue in the clevis in the opposite direction.

The sections of the roller being placed upon independent shafts, I am enabled to turn the machine more readily, as well as increase the facility of adjusting the rollers at the end of rows.

Having fully described my invention, what I now claim as new, and desire to secure by Letters Patent, is—

1. The combination, in a land-roller, of a frame having an intermediate beam and transverse front and rear beams rigidly connected to said intermediate beam, and independent shafts having one end of each of the said independent shafts journaled on said intermediate beam, and rollers on opposite sides of said intermediate beam adjustable longitudinally on said independent shafts from the said intermediate beam, and a removable end portion of said frame supporting the ends of said independent shafts opposite to that supported by the said intermediate beam, as described.

2. The combination, with a suitable frame having a central longitudinal beam and transverse front and rear beams rigidly connected to said longitudinal beam, of rollers on opposite sides of said longitudinal beam, provided with angular perforations through the axis of said rollers, and independent angular shafts for said rollers journaled at one end on said central longitudinal beam, and removable end beams supporting the opposite end of said shaft, and an adjustable collar fitted to said angular shaft on one side of said roller, as described.

3. The combination, in ground-pulverizers, with a rotating pulverizer journaled in a suitable frame, of a pulverizer attached to and in rear of said frame, and having a clevis and a tongue extending between the opposite parts of said clevis and connecting the pulverizer in rear with the frame of the said pulverizer preceding it, and adjusting devices securing the clevis at adjustable points on said tongue, as described.

4. The combination, in a frame for land-rollers, of a front beam and rear beam, a rigidly-connecting intermediate beam, and end beams removably attached to said front and rear beams, and angle-irons at the joints of said beams, furnished with slots and key-bolts for keying said beams to said angle-irons, as described.

JOHN M. BAILEY.

Witnesses:
FRED. W. PERKINS,
A. G. HOLMES.